US010829585B2

(12) United States Patent
Becquet et al.

(10) Patent No.: US 10,829,585 B2
(45) Date of Patent: Nov. 10, 2020

(54) LIQUID COMPOSITION FOR A WATERPROOFING MEMBRANE

(71) Applicant: BOSTIK SA, La Plaine Saint Denis (FR)

(72) Inventors: Jeremy Becquet, Moissy Cramayel (FR); Andre Mayer, Bois le Roi (FR)

(73) Assignee: BOSTIK SA, Colombes (FR)

( * ) Notice: Subject to any disclaimer, the term of this patent is extended or adjusted under 35 U.S.C. 154(b) by 226 days.

(21) Appl. No.: 16/066,486

(22) PCT Filed: Dec. 26, 2016

(86) PCT No.: PCT/FR2016/053670
§ 371 (c)(1),
(2) Date: Jun. 27, 2018

(87) PCT Pub. No.: WO2017/115046
PCT Pub. Date: Jul. 6, 2017

(65) Prior Publication Data
US 2019/0002627 A1 Jan. 3, 2019

(30) Foreign Application Priority Data
Dec. 28, 2015 (FR) ..................................... 15 63372

(51) Int. Cl.
| | |
|---|---|
| *C08G 18/83* | (2006.01) |
| *C08G 65/336* | (2006.01) |
| *C08K 5/17* | (2006.01) |
| *C08K 5/13* | (2006.01) |
| *C09D 171/02* | (2006.01) |
| *C09D 175/04* | (2006.01) |
| *C09D 201/10* | (2006.01) |
| *B32B 27/26* | (2006.01) |
| *B32B 27/28* | (2006.01) |
| *B32B 27/38* | (2006.01) |
| *B32B 27/40* | (2006.01) |
| *C08G 18/16* | (2006.01) |
| *C08G 18/18* | (2006.01) |
| *C08G 59/24* | (2006.01) |
| *C08G 59/68* | (2006.01) |
| *C08J 3/24* | (2006.01) |
| *C08G 59/50* | (2006.01) |

(52) U.S. Cl.
CPC ............ *C08G 18/837* (2013.01); *B32B 27/26* (2013.01); *B32B 27/285* (2013.01); *B32B 27/38* (2013.01); *B32B 27/40* (2013.01); *C08G 18/168* (2013.01); *C08G 18/1825* (2013.01); *C08G 59/245* (2013.01); *C08G 59/686* (2013.01); *C08G 65/336* (2013.01); *C08J 3/246* (2013.01); *C08K 5/13* (2013.01); *C08K 5/17* (2013.01); *C09D 171/02* (2013.01); *C09D 175/04* (2013.01); *C09D 201/10* (2013.01); *B32B 2305/72* (2013.01); *B32B 2307/7265* (2013.01); *C08G 59/50* (2013.01); *C08J 2363/02* (2013.01); *C08J 2383/08* (2013.01); *C08K 2201/014* (2013.01)

(58) Field of Classification Search
CPC ... C08L 101/10; C08G 65/336; C08G 59/245; C08J 3/246; C09D 174/04
See application file for complete search history.

(56) References Cited

U.S. PATENT DOCUMENTS

| 9,920,216 B2 | 3/2018 | Thorlaksen et al. |
| 2016/0017172 A1 | 1/2016 | Thorlaksen et al. |

FOREIGN PATENT DOCUMENTS

| JP | 04001222 | * | 1/1992 |
| JP | 2012246665 A | | 12/2012 |
| WO | 2014166492 A1 | | 10/2014 |

OTHER PUBLICATIONS

JP 04 001222 machine translation (1992).*
International Search Report for PCT/FR2016/053670 dated Mar. 30, 2017.
English Abstract for JP2012246665, Publication Date: Dec. 13, 2012.

* cited by examiner

*Primary Examiner* — Kuo Liang Peng
(74) *Attorney, Agent, or Firm* — Millen, White, Zelano and Branigan, P.C.

(57) ABSTRACT

The invention relates to a liquid bi-component composition comprising a silylated polymer having alkoxysilane functions, an epoxy resin, an amine catalyst for the epoxy and a catalyst for silanol condensation, and an adhesion promoter or a coupling agent. After crosslinking, the liquid composition according to the invention makes it possible to obtain a waterproofing membrane suitable for pedestrian and/or vehicle traffic.

19 Claims, No Drawings

LIQUID COMPOSITION FOR A WATERPROOFING MEMBRANE

FIELD OF THE INVENTION

The present invention relates to a two-component liquid composition which, after crosslinking, makes it possible to obtain a waterproofing membrane on surfaces intended for pedestrian and/or vehicular traffic, for example for outside seating areas, balconies, roofs or parking lots.

TECHNOLOGICAL BACKGROUND

The laying of waterproofing membranes in the form of liquid compositions is henceforth well known to professionals of the construction industry especially in roofing applications where these are henceforth used as an alternative to prefabricated sheet membranes. The use of liquid compositions makes it possible, on the one hand, to facilitate the laying in the case of roofs with complex geometries and for renovation works and, on the other hand, to obtain flexible and transparent continuous waterproofing coatings that adhere to the substrates.

The liquid compositions comprise one or more components, most often based on synthetic polymers either in non-aqueous solution or in aqueous dispersion, which after crosslinking form a thick water-impermeable film. Among the synthetic polymers used, mention may be made of polyurethanes, acrylic polymers, epoxy resins and also alkoxysilane-terminated polymers, polyurethanes being most commonly used.

The drawback of most liquid membranes is the thin thickness of the application layer (around 0.5 mm). Since the waterproofing membrane must have a final thickness of around 1.5 to 2 mm, it is necessary to apply several successive layers (3 layers at least); since each layer requires several hours before being able to apply the next one, several days are therefore needed to produce the waterproofing membrane.

Document WO 2014/114639 describes a one-component liquid composition for waterproofing membranes, said liquid composition comprising in particular a polyurethane polymer functionalized by isocyanate functions, obtained from a polyether polyol and diphenylmethylene diisocyanate. The membranes obtained using the compositions from this document do not have sufficient tear strength and do not allow pedestrian traffic on the membrane. It is not therefore possible to apply them to outside seating areas or balconies.

Document JP 2012-246665 describes a liquid composition comprising an organic polymer, an epoxy resin and an epoxy resin curing agent of phenolic tertiary amine type. This document illustrates compositions having high contents of phenolic tertiary amine type curing agent which result in losses of mechanical performance of the membrane over time and also in significant yellowing of this membrane once exposed to heat or ultraviolet rays.

The objective of the present invention is to provide a liquid composition which, after crosslinking, forms a waterproof film having satisfactory and durable mechanical characteristics and also a suitable visual appearance, this being in a manner that is durable over time.

SUMMARY OF THE INVENTION

A first subject of the present invention relates to a liquid composition comprising a composition A and a composition B, said composition A comprising:
A1) from 20% to 80% by weight of at least one silylated polymer comprising at least one, preferably at least two groups of formula (I):

in which:
$R^4$ and $R^5$, which are identical or different, each represent a linear or branched alkyl radical comprising from 1 to 4 carbon atoms, with the possibility that when there are several $R^4$ (or $R^5$) radicals, the latter are identical or different;
p is an integer equal to 0, 1 or 2;
A2) from 3% to 9% by weight of a mixture of at least two different aromatic-type catalysts (A2-1) and (A2-2), the catalyst (A2-1) being of phenolic type substituted by at least one —($CH_2$)—$N(R^7R^8)$ function, where $R^7$ and $R^8$ represent, independently of one another, a linear or branched alkyl radical comprising from 1 to 4 carbon atoms;
A3) from 0.1% to 2% by weight of at least one coupling agent for coupling between the silylated polymer present in the composition A and the epoxy resin present in the composition B;
and said composition B comprising:
B1) from 10% to 40% by weight of at least one epoxy resin;
B2) from 0.2% to 3% by weight of at least one silanol condensation catalyst;
the percentages by weight being expressed relative to the total weight of the liquid composition,
the mixture of at least two catalysts (A2-1) and (A2-2) being chosen so that the following two relationships are respected:
(1) 48.00 meq/g≤Φ(OH)+Φ($CH_2$—$NR^7R^8$)≤90.00 meq/g
(2) 0.10≤Φ(OH)/Φ($CH_2$—$NR^7R^8$)≤0.33
in said relationships (1) and (2):
Φ(OH) represents the number of —OH functions borne by an aromatic ring expressed in milliequivalents per gram of liquid composition;
Φ($CH_2$—$NR^7R^8$) represents the number of —$CH_2$—$NR^7R^8$ functions borne by an aromatic ring expressed in milliequivalents per gram of liquid composition.
According to one embodiment, the silylated polymer corresponds to one of the
formulae (II), (III) or (IV):

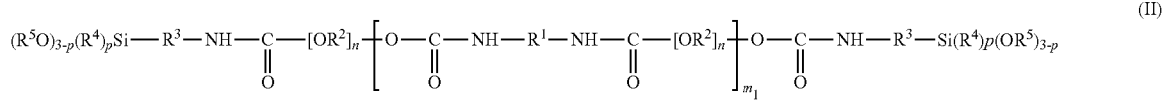

-continued

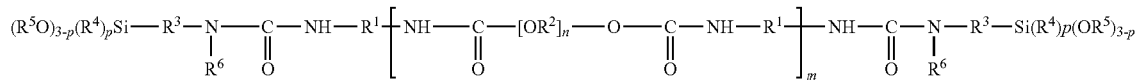
(IV)

in which:
- $R^1$ represents a hydrocarbon-based divalent radical comprising from 5 to 15 carbon atoms, which may be aromatic or aliphatic, linear, branched or cyclic,
- $R^3$ represents a linear or branched alkylene divalent radical comprising from 1 to 6 carbon atoms,
- $R^2$ represents a linear or branched alkylene divalent radical comprising from 2 to 4 carbon atoms,
- $R^4$ and $R^5$, which are identical or different, each represent a linear or branched alkyl radical comprising from 1 to 4 carbon atoms,
- $R^6$ represents a hydrogen atom, a phenyl radical or a linear, branched or cyclic alkyl radical comprising from 1 to 6 carbon atoms,
- n is an integer such that the average molar mass of the polyether block of formula $—[OR^2]_n—$ ranges from 200 g/mol to 40 000 g/mol,
- $m_1$ is zero or an integer such that the average molar mass of the polymer ranges from 500 g/mol to 50 000 g/mol,
- m is an integer other than zero such that the average molar mass of the polymer ranges from 500 g/mol to 50 000 g/mol,
- p is an integer equal to 0, 1 or 2.

According to one embodiment of the invention, the catalyst (A2-1) comprises at least one phenolic ring substituted by at least two $—(CH_2)—N(CH_3)_2$ functions, these two $—(CH_2)—N(CH_3)_2$ functions preferably being in the ortho position to the OH group.

Preferably, the catalyst (A2-1) is chosen from the following compounds:

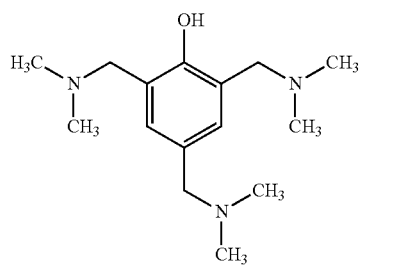

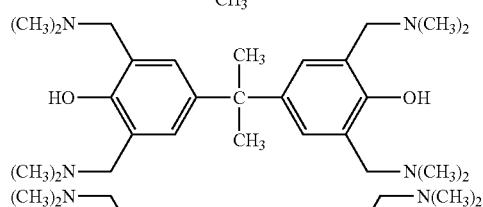

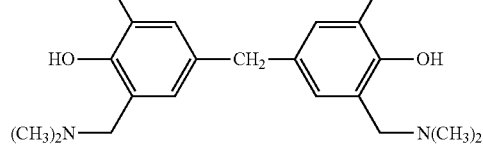

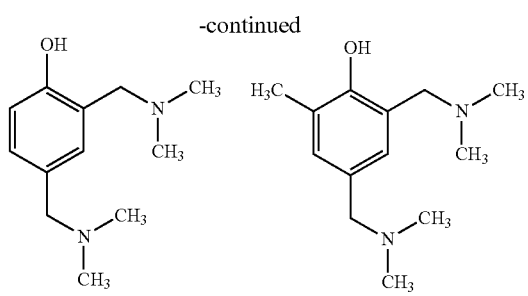

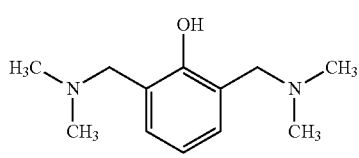

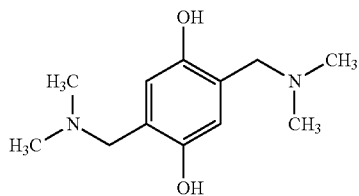

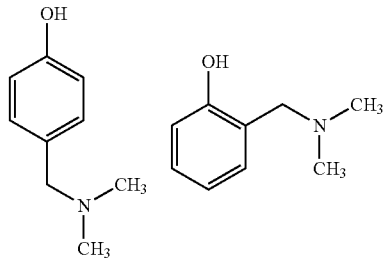

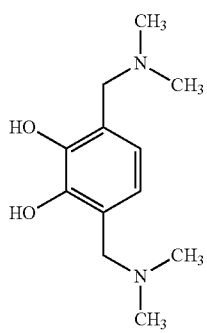

more preferably, the catalyst (A2-1) is the compound 2,4,6-tri(dimethylaminomethyl)phenol corresponding to the following formula:

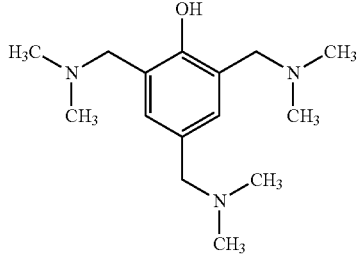

According to one embodiment of the invention, the catalyst (A2-2) different from the catalyst (A2-1) is chosen from the aromatic compounds comprising at least one hydroxyl function or at least one —(CH$_2$)—N(CH$_3$)$_2$ function.

Preferably, the catalyst (A2-2) is chosen from the following compounds:

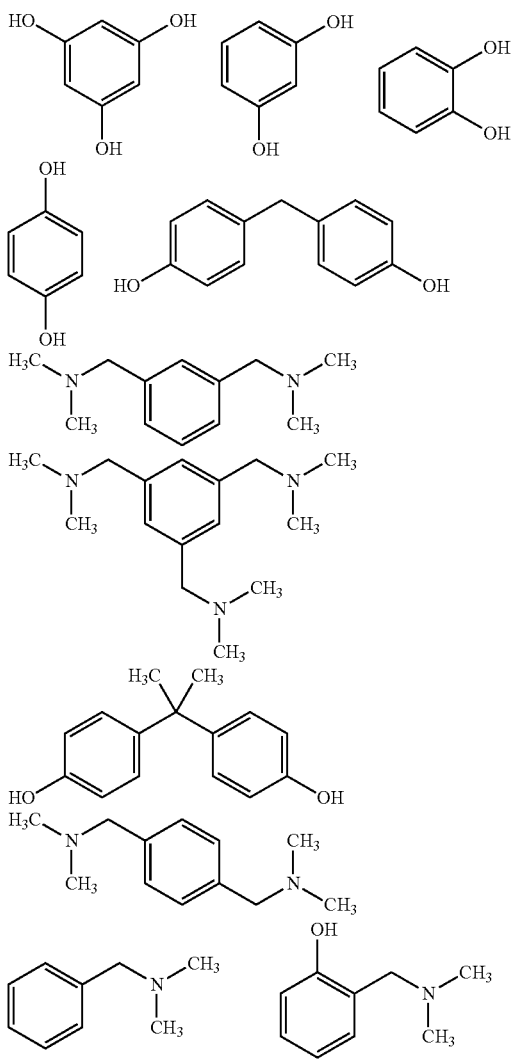

more preferably, the catalyst (A2-2) is chosen from the following compounds:

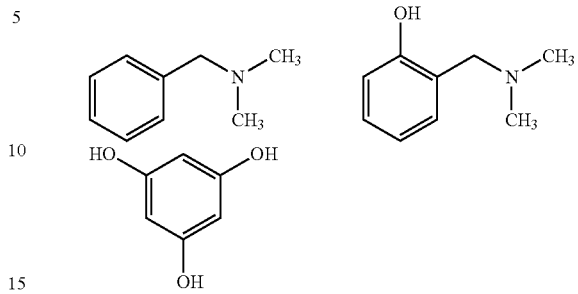

more preferentially still, the catalyst (A2-2) is the dimethylbenzylamine compound corresponding to the following formula:

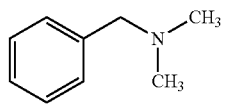

According to one particular embodiment, the catalyst (A2) comprises a mixture of 2,4,6-tri(dimethylaminomethyl)phenol as catalyst (A2-1) and of dimethylbenzylamine as catalyst (A2-2).

According to one embodiment of the invention, the following two relationships are respected in the liquid composition:

(1) 50.00 meq/g≤Φ(OH)+Φ(CH$_2$—NR$^7$R$^8$)≤90.00 meq/g (2) 0.10≤Φ(OH)/Φ(CH$_2$—NR$^7$R$^8$)≤0.30 in said relationships (1) and (2):

Φ(OH) represents the number of —OH functions borne by an aromatic ring expressed in milliequivalents per gram of liquid composition;

Φ((CH$_2$)—N(R$^7$R$^8$)$_2$) represents the number of —CH$_2$—NR$^7$R$^8$ functions borne by an aromatic ring expressed in milliequivalents per gram of liquid composition.

According to one embodiment of the invention, the epoxy resin (B1) is derived from diglycidyl ether, preferably a derivative of bisphenol A diglycidyl ether.

According to one embodiment of the invention, the coupling agent (A3) is a bifunctional compound comprising at least one first function capable of reacting with the silylated polymer (A1) and one second function capable of reacting with the epoxy resin (B1).

A second subject of the present invention relates to a ready-to-use kit comprising the liquid composition according to the invention, the compositions A and B being packaged in two separate compartments.

The present invention also relates to the use of the liquid composition according to the invention or of the kit according to the invention for the formation of a waterproofing membrane.

The present invention also relates to a waterproofing membrane obtained by crosslinking the liquid composition according to the invention.

Another subject of the present invention is a process for waterproofing a surface, said process comprising the application then crosslinking of the liquid composition according to the invention on said surface.

The present invention also relates to a surface coated with a membrane according to the invention.

The present invention makes it possible to provide a liquid composition for a waterproofing membrane, for use in an external environment.

The liquid composition according to the invention may be packaged in a form which renders it directly ready to use by a user, and the corresponding membrane has a very high tear strength allowing pedestrian traffic and lightweight vehicular traffic.

The waterproofing membrane according to the invention has an elongation of greater than 300% making it possible to follow the movements and deformations of the support without rupture.

The waterproofing membrane according to the invention renders the supports on which it is applied perfectly waterproof.

The tear resistance of the waterproofing membrane according to the invention allows traffic, that is to say that it is possible to walk on it without tearing it or creating a hole that lets water through.

The liquid composition according to the invention may be applied and adhere to concretes having a moisture of greater than 5% without delamination or bubble phenomena. This makes it possible to reduce the waiting time before laying the waterproofing membrane.

The liquid composition according to the invention may be applied and adhere to concrete without primer, the priming step requiring a waiting time of several hours. The absence of primer therefore saves time and money.

The waterproofing membrane obtained after crosslinking the liquid composition has satisfactory mechanical properties, in particular a satisfactory elongation at break. The elongation at break is an important property because the membrane must accompany the possible deformations of the supports and remain flexible at minus temperatures. In the case of too high a stiffness, the membrane could crack or have crazing that lets water through.

The waterproofing membrane according to the invention does not yellow, even under the effect of heat or UV radiation.

The surface coated with the membrane according to the invention is rendered waterproof by the application of a single layer of liquid composition. The waterproofing membrane according to the invention is a single-layer membrane.

DETAILED DESCRIPTION OF EMBODIMENTS OF THE INVENTION

The present invention relates to a liquid composition comprising:

a composition A comprising:

A1) from 20% to 80% by weight of at least one silylated polymer comprising at least one, preferably at least two groups of formula (I):

$$—Si(R^4)_p(OR^5)_{3-p} \quad (I)$$

wherein:
$R^4$ and $R^5$, which are identical or different, each represent a linear or branched alkyl radical comprising from 1 to 4 carbon atoms, with the possibility that when there are several $R^4$ (or $R^5$) radicals, the latter are identical or different;
p is an integer equal to 0, 1 or 2;

A2) from 3% to 9% by weight of a mixture of at least two aromatic-type catalysts (A2-1) and (A2-2), the catalyst (A2-1) being of phenolic type substituted by at least one $—(CH_2)—N(R^7R^8)$ function, where $R^7$ and $R^8$ represent, independently of one another, a linear or branched alkyl radical comprising from 1 to 4 carbon atoms;

A3) from 0.1% to 2% by weight of at least one coupling agent for coupling between the silylated polymer present in the composition A and the epoxy resin present in the composition B;

a composition B comprising:
B1) from 10% to 40% by weight of at least one epoxy resin;
B2) from 0.2% to 3% by weight of at least one silanol condensation catalyst;

the percentages by weight being expressed relative to the total weight of the liquid composition, the mixture of at least two catalysts (A2-1) and (A2-2) being chosen so that the following two relationships are respected:

(1) $48.00 \text{ meq/g} \leq \Phi(OH)+\Phi(CH_2—NR^7R^8) \leq 90.00 \text{ meq/g}$
(2) $0.10 \leq \Phi(OH)/\Phi(CH_2—NR^7R^8) \leq 0.33$ in said relationships (1) and (2):
$\Phi(OH)$ represents the number of —OH functions borne by an aromatic ring expressed in milliequivalents per gram of liquid composition;
$\Phi(CH_2—NR^7R^8)$ represents the number of $—CH_2—NR^7R^8$ functions borne by an aromatic ring expressed in milliequivalents per gram of liquid composition.

According to one embodiment of the invention, the liquid composition according to the invention is in two-component (two-part) form, in which the composition A is in a first compartment and the composition B is in a second compartment. Advantageously, the composition A and the composition B are mixed by extemporaneous mixing before the liquid composition is applied to the support or the surface to be rendered waterproof (to be sealed).

Silylated Polymer (A1)

Within the meaning of the present invention, a silylated polymer is understood to mean a polymer comprising at least one alkoxysilane group. Preferably, the silylated polymer comprising at least one alkoxysilane group is a polymer comprising at least one, preferably at least two groups of formula (I):

$$—Si(R^4)_p(OR^5)_{3-p} \quad (I)$$

wherein:
$R^4$ and $R^5$, which are identical or different, each represent a linear or branched alkyl radical comprising from 1 to 4 carbon atoms, with the possibility that when there are several $R^4$ (or $R^5$) radicals, the latter are identical or different;
p is an integer equal to 0, 1 or 2.

The silylated polymer as defined above comprises at least one crosslinkable alkoxysilyl group. The crosslinkable alkoxysilyl group is preferably in the terminal position of said polymer. A position in the middle of the chain is not however excluded. The silylated polymer is not crosslinked before the application of the liquid composition. The liquid composition is applied under conditions that enable the crosslinking thereof.

The silylated polymer is generally in the form of a more or less viscous liquid.

Preferably, the silylated polymer has a viscosity of less than 20 Pa·s, said viscosity being measured according to a Brookfield-type method at 23° C. and 50% relative humidity.

According to one embodiment, the silylated polymer comprises at least two groups of formula (I), preferably at least three groups of formula (I), more preferably at least four groups of formula (I).

Preferably, the silylated polymer or polymers have an average molar mass ranging from 500 to 50 000 g/mol, more preferably ranging from 700 to 20 000 g/mol. The molar mass of the polymers may be measured by methods well known to a person skilled in the art, for example by NMR and size exclusion chromatography using polyethylene glycol standards.

Preferably, the silylated polymers are chosen from silylated polyurethanes, silylated polyethers, and mixtures thereof.

According to one embodiment, the silylated polymer corresponds to one of the formulae (II), (III) or (IV):

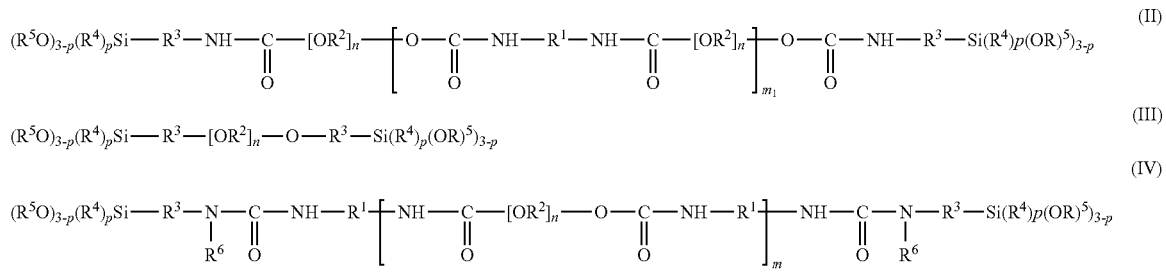

In the formulae (II), (III) and (IV):
- $R^1$ represents a hydrocarbon-based divalent radical comprising from 5 to 15 carbon atoms, which may be aromatic or aliphatic, linear, branched or cyclic,
- $R^3$ represents a linear or branched alkylene divalent radical comprising from 1 to 6 carbon atoms,
- $R^2$ represents a linear or branched alkylene divalent radical comprising from 2 to 4 carbon atoms,
- $R^4$ and $R^5$, which are identical or different, each represent a linear or branched alkyl radical comprising from 1 to 4 carbon atoms,
- $R^6$ represents a hydrogen atom, a phenyl radical or a linear, branched or cyclic alkyl radical comprising from 1 to 6 carbon atoms,
- n is an integer such that the average molar mass of the polyether block of formula $—[OR^2]_n—$ ranges from 200 g/mol to 40 000 g/mol,
- $m_1$ is zero or an integer such that the average molar mass of the polymer ranges from 500 g/mol to 50 000 g/mol,
- m is an integer other than zero such that the average molar mass of the polymer ranges from 500 g/mol to 50 000 g/mol,
- p is an integer equal to 0, 1 or 2.

Preferably, $R^1$ is chosen from one of the following divalent radicals, of which the formulae below show the 2 free valencies:

a) the divalent radical derived from isophorone:

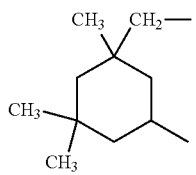

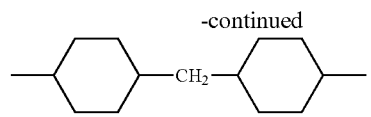

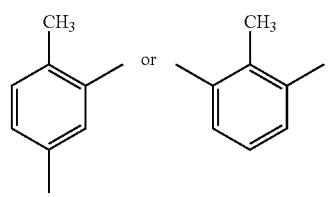

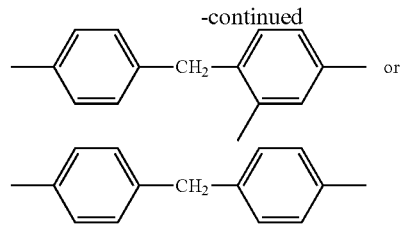

b)
c)
d)
e) $—(CH_2)_6—$ (or hexamethylene radical)

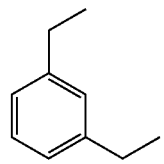

f)

The polymers of formula (II) may be obtained according to a process described in documents EP 2336208 and WO 2009/106699. Among the polymers corresponding to the formula (II), mention may be made of:
- GENIOSIL® STP-E10 (available from Wacker): polyether comprising two groups (I) of dimethoxy type ($m_1$ equal to 0, p equal to 1 and $R^4$ and $R^5$ represent a methyl group) having a number-average molar mass of 8889 g/mol where $R^3$ represents a methyl group;
- GENIOSIL® STP-E30 (available from Wacker): polyether comprising two groups (I) of dimethoxy type ($m_1$ equal to 0, p equal to 1 and $R^4$ and $R^5$ represent a methyl group) having a number-average molar mass of 14 493 g/mol where $R^3$ represents a methyl group;

SPUR+® 1050MM (available from Momentive): polyurethane comprising two groups (I) of trimethoxy type ($m_1$ other than 0, p equal to 0 and $R^5$ represents a methyl group) having a number-average molar mass of 16 393 g/mol where $R^3$ represents an n-propyl group;

SPUR+® Y-19116 (available from Momentive): polyurethane comprising two groups (I) of trimethoxy type ($m_1$ other than 0 and $R^5$ represents a methyl group) having a number-average molar mass ranging from 15 000 to 17 000 g/mol g/mol where $R^3$ represents an n-propyl group;

DESMOSEAL® S XP 2636 (available from Bayer): polyurethane comprising two groups (I) of trimethoxy type ($m_1$ other than 0, p equal to 0 and $R^5$ represents a methyl group) having a number-average molar mass of 15 038 g/mol where $R^3$ represents an n-propyl group.

The polymers of formula (III) may be obtained by hydrosilylation of polyether diallyl ether according to a process described for example in document EP 1 829 928. Among the polymers corresponding to the formula (III), mention may be made of the polymer MS SAX® 350 (available from Kaneka) corresponding to a polyether comprising two groups (I) of dimethoxy type (p equal to 1 and $R^4$ represents a methyl group) having a number-average molar mass ranging from 14 000 to 16 000 daltons.

According to one preferred embodiment of the invention, the composition of the liquid waterproofing coating comprises at least one silylated polymer of formula (III).

According to one particular embodiment, the liquid composition according to the invention comprises no polymer of acrylate or methacrylate type or of acrylic or methacrylic type.

According to one particular embodiment, the silylated polymer (A1) according to the invention is different from a silicone polymer of polysiloxane type.

According to one embodiment of the invention, all the silylated polymers of the liquid composition are chosen from the polymers of formula (II), (III) or (IV) as defined above.

The silylated polymer or polymers are present in a proportion of from 20% to 80% by weight, preferably from 40% to 65% by weight, of the total weight of the liquid composition.

Aromatic-Type Catalysts (A2)

The aromatic-type catalysts (A2) enable the homopolymerization of the epoxy resin.

The composition A comprises a mixture of at least two different aromatic-type catalysts (A2-1) and (A2-2), of which at least one of the two catalysts is of phenolic type substituted by at least one —$(CH_2)$—$N(R^7R^8)$ function (catalyst referred to as A2-1). Preferably, at least one OH function and at least one —$(CH_2)$—$N(R^7R^8)$ function of the catalyst (A2-1) are in the ortho position relative to one another on the aromatic ring.

According to one embodiment of the invention, the catalyst (A2-1) comprises at least one phenolic ring substituted by at least two —$(CH_2)$—$N(R^7R^8)$ functions that are preferably in the ortho position to the OH radical.

$R^7$ and $R^8$ represent, independently of one another, a linear or branched alkyl radical comprising from 1 to 4 carbon atoms, preferably from 1 to 3 carbon atoms, more preferably from 1 to 2 carbon atoms.

According to one embodiment, $R^7$ and $R^8$ are identical.

According to one embodiment, $R^7$ and $R^8$ are identical and represent a methyl group.

The second aromatic-type catalyst (A2-2) is different from the first catalyst (A2-1) and may be chosen from aromatic compounds comprising at least one hydroxyl function or at least one —$(CH_2)$—$N(R^7R^8)$ function, $R^7$ and $R^8$ have the same meaning as for the catalyst (A2-1).

The mixture of at least two catalysts (A2-1) and (A2-2) is chosen so that the following two relationships are respected:
(1) 48.00 meq/g≤Φ(OH)+Φ($CH_2$—$NR^7R^8$)≤90.00 meq/g
(2) 0.10≤Φ(OH)/Φ($CH_2$—$NR^7R^8$)≤0.33 in these two relationships:
Φ(OH) represents the number of —OH functions borne by an aromatic ring expressed in milliequivalents per gram of liquid composition;
Φ($CH_2$—$NR^7R^8$) represents the number of —$CH_2$—$NR^7R^8$ functions borne by an aromatic ring expressed in milliequivalents per gram of liquid composition.

Φ(OH) and Φ($CH_2$—$NR^7R^8$) may be determined from the molar mass of the constituents bearing one or more —OH and/or —$CH_2$—$NR^7R^8$ functions borne by an aromatic ring and the weight percentages of these constituents in the liquid composition.

Preferably, the mixture of at least two catalysts (A2-1) and (A2-2) is chosen so that the following two relationships are respected:
(1) 50.00 meq/g≤Φ(OH)+Φ($CH_2$—$NR^7R^8$)≤90.00 meq/g
(2) 0.10≤Φ(OH)/Φ($CH_2$—$NR^7R^8$)≤0.30.

More preferably, the mixture of at least two catalysts (A2-1) and (A2-2) is chosen so that the following two relationships are respected:
(1) 50.00 meq/g≤Φ(OH)+Φ($CH_2$—$NR^7R^8$)≤90.00 meq/g
(2) 0.15 Φ(OH)/Φ($CH_2$—$NR^7R^8$)≤0.30.

More preferentially still, the mixture of at least two catalysts (A2-1) and (A2-2) is chosen so that the following two relationships are respected:
(1) 65.00 meq/g≤Φ(OH)+Φ($CH_2$—$NR^7R^8$)≤90.00 meq/g
(2) 0.15≤Φ(OH)/Φ($CH_2$—$NR^7R^8$)≤0.25.

According to one embodiment of the invention, the mixture of at least two catalysts (A2) represents from 3% to 8% by weight, preferably from 4% to 8% by weight, more preferably from 5% to 7% by weight, relative to the total weight of the liquid composition.

According to one embodiment of the invention, the mixture of at least two catalysts (A2-1) and (A2-2) consists of two catalysts (A2-1) and (A2-2).

According to one embodiment of the invention, the catalyst (A2-1) is chosen non-limitingly from the following compounds:

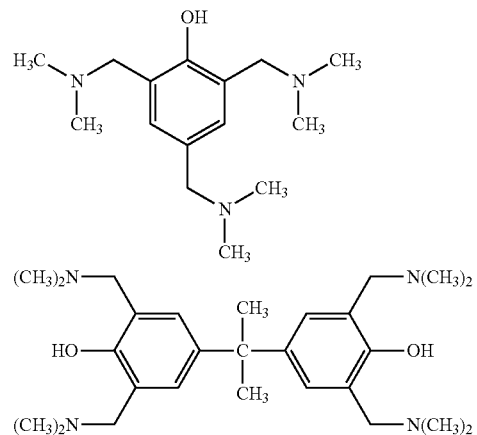

-continued

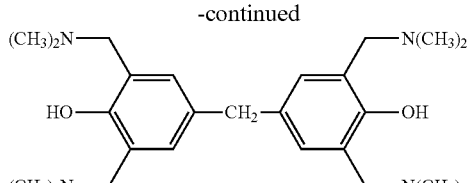

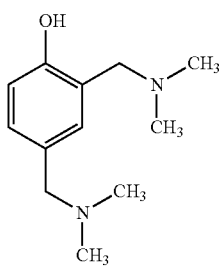

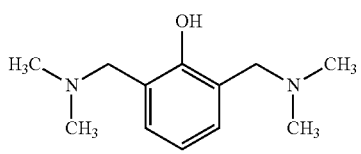

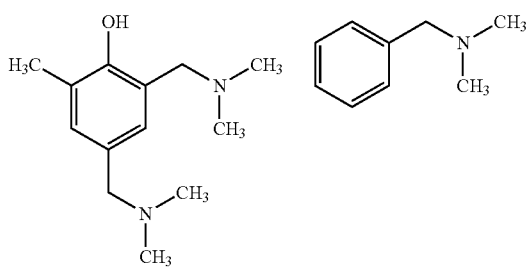

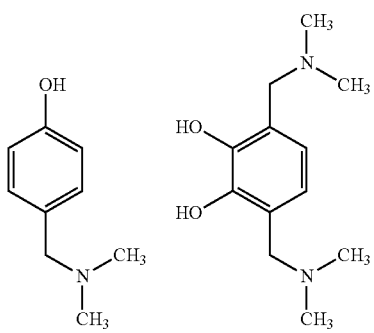

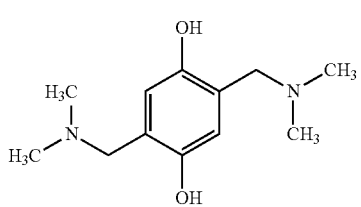

Preferably, the first catalyst (A2-1) is the compound 2,4,6-tri(dimethylaminomethyl)phenol corresponding to the following formula:

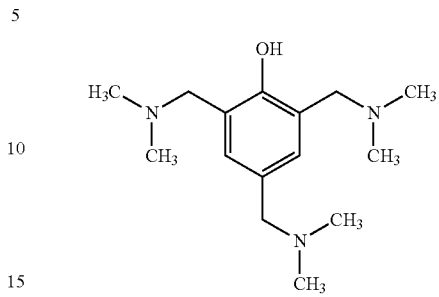

said 2,4,6-tri(dimethylaminomethyl)phenol compound being commercially available under the name ANCAMINE® K54 from Air Products.

Preferably, the liquid composition comprises less than 6% by weight of 2,4,6-tri(dimethylaminomethyl)phenol, expressed relative to the total weight of the liquid composition.

When the composition comprises large amounts of 2,4,6-tri(dimethylaminomethyl)phenol, for example 6% by weight, then the liquid composition has a tendency to yellow over time, which is unsatisfactory for the user from an esthetic point of view.

More preferably, the liquid composition comprises from 2% to 5% by weight, more preferentially from 2.5% to 4% by weight, advantageously from 2.7% to 3.7% by weight of 2,4,6-tri(dimethylaminomethyl)phenol, relative to the total weight of the liquid composition.

According to one embodiment of the invention, the second catalyst (A2-2) may be chosen from one of the compounds listed above, it being understood that the catalyst (A2-1) is different from the catalyst (A2-2).

Moreover, the second catalyst (A2-2), of the mixture of at least two catalysts, may be chosen from the following compounds:

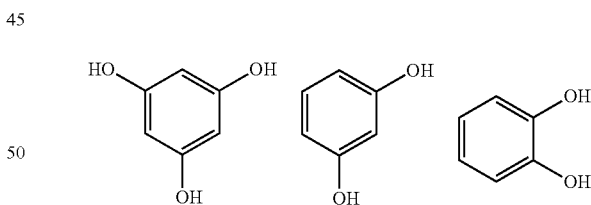

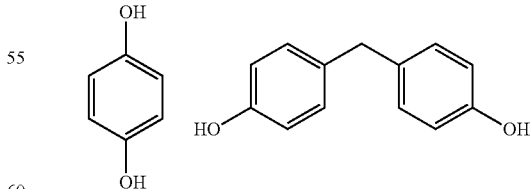

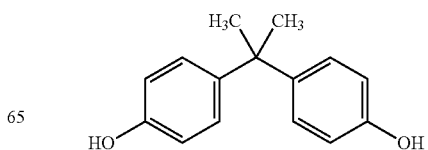

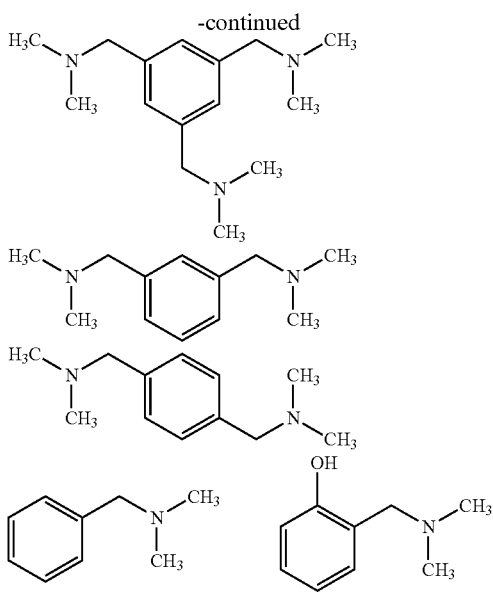

According to one embodiment of the invention, the catalyst (A2-2) is chosen from the compounds:

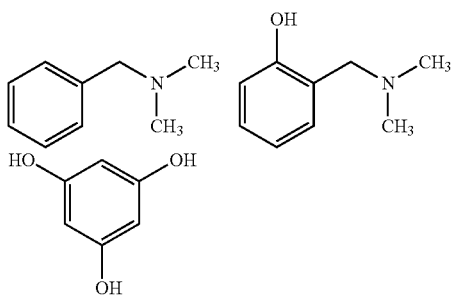

Preferably, the catalyst (A2-2) is the dimethylbenzylamine (BDMA) compound corresponding to the following formula:

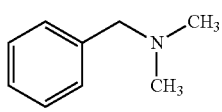

said dimethylbenzylamine compound being commercially available from the company Air Products.

According to one embodiment of the invention, the catalyst (A2) is a mixture comprising 2,4,6-tri(dimethylaminomethyl)phenol as catalyst (A2-1) and of dimethylbenzylamine as catalyst (A2-2). According to this embodiment, the mixture preferably comprises:

from 2% to 5% by weight, preferably from 2.5% to 4% by weight, more preferably from 3.0% to 3.5% by weight of 2,4,6-tri(dimethylaminomethyl)phenol, from 2% to 5.5% by weight, preferably from 2.5% to 4% by weight, more preferably from 3.0% to 3.5% by weight of dimethylbenzylamine, relative to the total weight of the liquid composition.

Coupling Agent or Adhesion Promoter (A3)

The liquid composition according to the invention comprises at least one coupling agent (A3), also referred to as an adhesion promoter, which makes it possible to act as an adhesion promoter and anchorage point between the epoxy resin and the silylated polymer.

According to one embodiment, the coupling agent (A3) is a bifunctional compound comprising at least one first function capable of reacting with the silylated polymer (A1) and at least one second function capable of reacting with the epoxy resin (B1).

According to one embodiment, the first function capable of reacting with the silylated polymer is a silane function, preferably an alkoxysilane function where the alkoxy groups preferably have from 1 to 3 carbon atoms, more preferably a trialkoxysilane function where the alkoxy groups preferably have 1 carbon atom.

According to one embodiment, the second function capable of reacting with the epoxy resin is chosen from amine functions, preferably primary amine functions, mercapto functions (—SH functions) or epoxy functions.

Preferably, the adhesion promoter or coupling agent (A3) is chosen from aminosilanes, mercaptosilanes or epoxysilanes, preferably from aminosilanes.

Within the meaning of the present invention, an "aminosilane", "mercaptosilane" or "epoxysilane" is understood to mean a compound comprising at least one amine, mercapto or epoxy function respectively, and at least one silane function.

According to one embodiment of the invention, the amine or mercapto or epoxy function and the silane function of the aminosilane or mercaptosilane or epoxysilane are separated by a linear, branched or cyclic alkyl group comprising from 1 to 16 carbon atoms, preferably from 1 to 12 carbon atoms, more preferably from 2 to 8 carbon atoms, advantageously from 3 to 6 carbon atoms.

According to one embodiment of the invention, the aminosilane or mercaptosilane or epoxysilane is chosen from the compounds comprising a primary amine or mercapto or epoxy function and an alkoxysilane function, said alkoxysilane function being for example a trialkoxysilane function. According to this embodiment, the alkoxysilane function preferably comprises from 1 to 4 carbon atoms, more preferably from 1 to 3 carbon atoms, advantageously from 1 to 2 carbon atoms.

As examples of adhesion promoter or coupling agent (A3), mention may be made of N-(2-aminoethyl)-3-aminopropyltrimethoxysilane (GENIOSIL® GF 91), 3-aminopropyltrimethoxysilane (SILQUEST® A-1100), both available from the company WACKER, N-(beta-aminoethyl)-gamma-aminopropyltrimethoxysilane (SILQUEST® A1120) available from the company Momentive, (3-mercaptopropyl)trimethoxysilane (Dynasylan® MTMO) available from the company EVONIK and 3-glycidoxypropyltrimethoxysilane (GENIOSIL® GF 80) available from the company WACKER.

The liquid composition according to the invention may, according to one embodiment, comprise a mixture of at least two different coupling agents (A3), including preferably at least one aminosilane.

The adhesion promoter(s) or coupling agent(s) is/are thus added to the composition A.

The adhesion promoter or coupling agent represents from 0.1% to 2% by weight, preferably from 0.5% to 1.5% by weight, more preferably from 0.4% to 1.25% by weight, of the total weight of the liquid composition.

Epoxy Resin (B1)

Within the meaning of the present invention, the epoxy resin is a compound comprising at least two epoxy functions, said epoxy functions preferably being in the terminal position.

According to one embodiment, the epoxy resin (B1) is a derivative of diglycidyl ether.

The diglycidyl ether derivatives that may be used in the liquid composition according to the invention are diglycidyl ethers capable of being obtained by reaction of haloepoxides such as epichlorohydrin (also known as 2-(chloromethyl) oxirane) or 13-methyl-epichlorohydrin with bisphenol A, bisphenol AD or bisphenol F. Bisphenol A (or 2,2-bis(4-hydroxyphenyl)propane) has the formula:

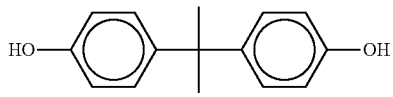

Bisphenol AD (or 1,1-bis(4-hydroxyphenyl)ethane) has the formula:

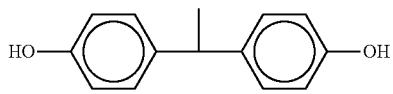

Bisphenol F (bis(4-hydroxyphenyl)methane) has the formula:

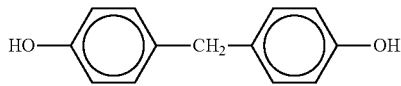

According to one embodiment of the invention, the epoxy resin (B1) is a derivative of bisphenol A diglycidyl ether (also known under the acronym BADGE), of formula below is preferred:

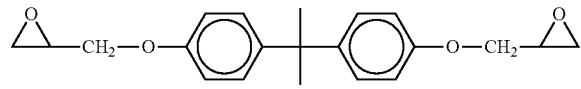

This compound is available under the commercial reference D.E.R. 331 from Dow.

The epoxy resins (B1) are present in a proportion of from 10% to 40% by weight, preferably from 20% to 33% by weight, of the total weight of the liquid composition.

Silylated Polymer Catalyst (B2)

The catalysts B2 used in the liquid composition according to the invention may be any catalyst known by a person skilled in the art for condensation of silanol in the presence of moisture such as amines or organometallic derivatives of iron, of titanium, of aluminum that are for the most part commercially available. Examples that may be mentioned include:

- organotitanium derivatives, such as titanium acetylacetonate (TYZOR® AA75) commercially available from the company DuPont,
- aluminum chelates such as K-KAT® 5218 available from King Industries,
- 1,8-diazabicyclo[5.4.0]undec-7-ene (DBU) or 1,5-diazabicyclo[4.3.0]non-5-ene (DBN),
- organotin derivatives (NEOSTANN® S-1 or TIB-KAT® 324) available respectively from NITTO KASEI and from TIB Chemicals. These tin-based catalysts are particularly suitable for silylated polymers of formula (III).

The catalyst or catalysts (B2) are present in a proportion of from 0.2% to 3% by weight, preferably from 0.8% to 2.5% by weight, more preferably from 0.4% to 1.25% by weight, of the total weight of the liquid composition.

Aminosilane-type catalysts for the condensation of silanols exist. In this case, the amount of aminosilane-type catalyst (B2) in the liquid composition is to be added in addition to the amount of aminosilane-type coupling agent or adhesion promoter.

Other Additives

The liquid composition according to the invention may further comprise mineral or organic fillers. These fillers are preferably introduced into the composition B, the part comprising the epoxy.

The role of the fillers is to reinforce the membrane after curing. The filler is preferentially of mineral type, for example chosen from sand, glass beads, glass, quartz, barite, alumina, mica, talc. The filler is preferentially chosen from talc and glass beads.

According to another embodiment, the composition comprises at least three different fillers chosen from sand, glass beads, glass, quartz, barite, alumina, mica, talc.

It has been observed that the use of glass beads makes it possible more particularly to retain a good tear resistance.

The glass beads used in the present invention preferably have a particle size ranging from 1 to 400 m, preferably ranging from 10 to 350 m and preferably ranging from 50 to 300 m. By way of example, mention will be made of the glass beads available from the company POTTERS under the commercial reference SPHERIGLASS® 2024 CP00 having a particle size distribution ranging from 106 to 212 m and an untapped bulk density (measured according to ASTM D-3101-78) of around 1.17 kg/m$^3$ and a tapped bulk density of around 1.26 kg/m$^3$.

If talc is used, its particle size is preferably between 2 and 25 m, preferably between 5 and 15 m. By way of example, mention will be made of LUZENAC® 20M2 available from the company IMERYS Talc.

When fillers are present, they may represent up to 50% by weight, preferably from 20% to 40% by weight, of the total weight of the liquid composition.

The liquid composition according to the invention may further comprise at least one additional additive chosen from plasticizers, solvents, in particular volatile solvents, organic or inorganic pigments, moisture scavengers, UV stabilizers, heat stabilizers, defoamers. This or these other additional additives are preferably added to the composition B, with the exception of the moisture scavenger(s) which are added to the composition A.

As defoamer, mention may be made of BYK® 515 A available from the company BYK, the DISPARLON OX® 880 EF and DISPARLON® 1958 defoamers, both available from the company KUSOMOTO Chemicals.

The plasticizer may for example be chosen from esters of benzoic acid, phthalic acid, trimellitic acid, pyromellitic acid, adipic acid, sebacic acid, fumaric acid, maleic acid, itaconic acid or citric acid or from derivatives of polyester, of polyether, of hydrocarbon mineral oil. Among the derivatives of phthalic acid, mention may be made of phthalates, such as dibutyl phthalate, dioctyl phthalate, dicyclohexyl phthalate, diisooctyl phthalate, diisodecyl phthalate, dibenzyl phthalate or butylbenzyl phthalate. If the plasticizer is present, it is preferably chosen from phthalates, sebacates, adipates and benzoates.

The plasticizer must be compatible with the polymer and not separate in the liquid composition. The plasticizer makes it possible to increase the plasticity (elongation) of the composition and to reduce its viscosity.

When a plasticizer is present in the composition, its content is preferably less than or equal to 5% by weight, preferably less than or equal to 3% by weight, expressed relative to the total weight of the liquid composition. When it is present, the plasticizer represents from 0.1% to 5% by weight or preferably 0.5% to 3% by weight of the total weight of the liquid composition.

The solvent is preferably a solvent that is volatile at room temperature (around 23° C.). The volatile solvent may for example be chosen from alcohols that are volatile at room temperature, such as ethanol or isopropanol. The volatile solvent makes it possible to reduce the viscosity of the composition and make the liquid composition easier to apply. The volatile nature of the solvent makes it possible for the membrane, obtained after crosslinking the composition, to no longer contain solvent and for the mechanical properties of the membrane to no longer be detrimentally affected.

When a solvent, in particular a volatile solvent, is present in the composition, its content is preferably less than or equal to 3% by weight, preferably less than or equal to 2% by weight, expressed relative to the total weight of the liquid composition. When it is present, the solvent, in particular the volatile solvent, is present in a proportion of from 0.5% to 3% by weight and preferably 1% to 2% by weight of the total weight of the liquid composition.

When a pigment is present in the composition, its content is less than or equal to 3% by weight, preferably less than or equal to 2% by weight, expressed relative to the total weight of the liquid composition. When it is present, the pigment is present in a proportion of from 0.1% to 3% by weight and preferably 0.5% to 2% by weight of the total weight of the liquid composition. The pigments may be organic or inorganic pigments.

The moisture scavenger, if it is present, may be chosen from vinyltrimethoxysilane (VTMO) such as SILQUEST® A171 available from the company MOMENTIVE, vinyltriethoxysilane (VTEO) such as GENIOSIL® GF 56 available from the company WACKER or alkoxyarylsilanes such as GENIOSIL® XL 70 available from the company WACKER.

It may be added to the composition A in order to prevent the silylated polymer from reacting.

When a moisture scavenger is present in the composition, its content is preferably less than or equal to 3% by weight, more preferably less than or equal to 2% by weight, expressed relative to the total weight of the liquid composition. When it is present, the moisture scavenger is present in a proportion of from 0.5% to 3% by weight and preferably 1% to 2% by weight of the total weight of the liquid composition.

UV and heat stabilizers may be added in order to prevent (slow down or stop) a degradation of the polymer for a better resistance to UV radiation or to thermal shocks. As examples, mention will be made of TINUVIN® 123, TINUVIN® 326 or IRGANOX® 245 available from the company BASF.

Water may optionally be added as a component, owing to the moisture-crosslinkable nature of the liquid composition according to the present invention. Preferably, water is then added to the composition B. Since the silylated polymers crosslink with moisture from the air, an addition of water may make it possible to accelerate the increase in the cohesion of the membrane, which is particularly useful in the case of large thicknesses (greater than 0.5 mm) in order to accelerate the crosslinking reaction of the silylated polymer. It is possible to use tap water or industrial water or distilled water, etc. As regards the amount of water added, the content varies from 0.1% to 1% of the weight of the silylated polymer. An amount of less than 0.1% would not make it possible to sufficiently accelerate the reaction and an amount of greater than 1% could lead to loss of adhesion.

Liquid Composition

According to one particular embodiment of the invention, the liquid composition comprises:
  a composition A comprising:
    from 20% to 80% by weight, preferably from 40% to 65% by weight, of at least one silylated polymer (A1),
    from 3% to 9% by weight, preferably from 4% to 8% by weight, of a mixture of at least two amino catalysts (A2) for a diglycidyl ether derivative,
    from 0.1% to 2% by weight, preferably from 0.5% to 1.5% by weight, of at least one aminosilane-type adhesion promoter or coupling agent (A3),
  a composition B comprising:
    from 10% to 40% by weight, preferably from 20% to 33% by weight, of a diglycidyl ether derivative (B1), and
    from 0.2% to 3% by weight, preferably from 0.8% to 2.5% by weight, of a silylated polymer catalyst (B2),
the percentages being expressed relative to the total weight of the liquid composition.

The liquid composition is not crosslinked before it is applied to the support.

The liquid composition is applied under conditions that enable the crosslinking thereof. The crosslinking of the liquid composition is expressed by the formation of a three-dimensional polymeric network between the polymer chains of the silylated polymer and the epoxy resin.

Ready-to-Use Kit

The invention also relates to a ready-to-use kit comprising the liquid composition according to the invention, the compositions A and B being packaged in two separate compartments.

Process for Preparing the Liquid Composition According to the Invention

The present invention also relates to a process for preparing the liquid composition according to the invention.

The process for preparing the composition A comprises the mixing of the constituents of the composition A with the exclusion of moisture, preferably under anhydrous conditions and under an inert atmosphere, for example under a nitrogen atmosphere, preferably at atmospheric pressure. A vacuum may be applied in order to remove the bubbles from the mixture. The composition A of the liquid composition is preferably packaged with the exclusion of air, in particular with exclusion of moisture from the air, in hermetic packaging. The silylated part (composition A) is for example stored under inert atmosphere (nitrogen atmosphere) and/or in vacuum bags especially aluminum bags which are particularly suitable.

The process for preparing the composition B comprises the mixing of the constituents of the composition B. This mixing may be carried out at room temperature (23° C.) and at atmospheric pressure. A vacuum may be applied in order to remove the bubbles from the mixture. Since the epoxy resin part (composition B) does not require an inert atmosphere or application of the vacuum, this part is packaged in a metal bucket.

The implementation of the liquid composition comprises the mixing of the composition A with the composition B. The two compositions A and B of the liquid composition are intended to be mixed by extemporaneous mixing, during the use of said liquid composition for producing the waterproofing membrane.

During the application of the liquid composition, the user mixes the 2 compositions A and B preferentially in a one-to-one ratio by weight using for example a rotary mixer equipped with a mixing arm.

Creation of the Watertightness

The present invention relates to the use of the liquid composition according to the invention or of the kit according to the invention for the formation of a waterproofing membrane.

The present invention also relates to a waterproofing membrane obtained by crosslinking the liquid composition according to the invention. Specifically, the liquid composition, after mixing of the two compositions A and B, will crosslink and form a waterproof membrane, atmospheric moisture may make it possible to accelerate the crosslinking of the liquid composition.

The membrane according to the invention may for example have a thickness greater than or equal to 1.5 mm, preferably ranging from 1.5 mm to 3 mm.

The present invention also relates to a process for waterproofing a surface, said process comprising the application and crosslinking of the liquid composition according to the invention on said surface.

The application of the liquid composition may take place in the presence of atmospheric moisture which promotes the crosslinking.

According to one embodiment, the liquid composition is heated at a temperature ranging from 25° C. to 40° C., which accelerates the rate of crosslinking.

The surface may be chosen from concrete, old waterproofing coatings of aliphatic polyurethane or aqueous polyurethane type, old bituminous membranes, and steel or aluminum tank coatings.

Preferably, no primer layer is present between the membrane according to the invention and the surface to be waterproofed.

The surface may be wet and comprise for example up to 5% moisture.

The liquid composition according to the invention may be applied by any process known to a person skilled in the art, for example using a serrated spatula, a scraper, a brush, a fine brush, a spray gun or else using a paint roller.

Preferably, the waterproofing process comprises a single step of applying the liquid composition. Thus, the waterproofing membrane according to the invention is preferably a "single-layer" membrane.

The present invention also relates to a surface coated with a membrane according to the invention.

Preferably, the surface is chosen from concrete, old waterproofing coatings of aliphatic polyurethane or aqueous polyurethane type, old bituminous membranes, and steel or aluminum tank coatings.

Preferably, the membrane according to the invention has a thickness greater than or equal to 1.5 mm, preferably ranging from 1.5 mm to 3 mm.

Preferably, no primer layer is present between the membrane according to the invention and the surface.

Preferably, the surface coated according to the invention comprises a single waterproofing membrane, obtained after a single application of liquid composition according to the invention.

EXAMPLES

Example 1: Comparison of the Various Existing Technologies with that of the Invention Table 1 below compares various existing technologies (epoxy, silylated polymer, polyurethane, acrylic) with the composition according to the invention (epoxy-silylated polymer two-component composition) for the preparation of a liquid composition for a waterproofing membrane, with respect to several characteristics:

color stability, evaluated visually: a "no" signifies that the color of the waterproof membrane is not stable (yellowing over time), a "yes" signifies that the color of the waterproof membrane is stable (no yellowing over time);

tear strength, measured according to the standard ISO 34-1 (method A, "trouser test specimen"): a "yes" signifies that the shear strength of the membrane (Tear Strength) is greater than or equal to 8 N/mm, a "no" signifies that the shear strength of the membrane is less than 8 N/mm;

adhesion to wet concrete, evaluated by measuring the adhesion using a SATTEC dynamometer: a "yes" signifies that the adhesion to wet concrete is greater than or equal to 0.05 N/mm$^2$ and a "no" signifies that the adhesion to wet concrete is less than 0.05 N/mm$^2$;

adhesion to concrete without primer, evaluated by measuring the adhesion using a SATTEC dynamometer: a "yes" signifies that the membrane adheres to concrete without the need for a primer (intermediate layer between the concrete and the membrane) and a "no" signifies that the membrane does not adhere to concrete if there is no primer, it is considered that there is no adhesion when the adhesion is less than 0.05 N/mm$^2$;

elongation greater than 300%, measured according to the standard ISO 527-1: a "yes" signifies that the membrane has an elongation of greater than 300%, a "no" signifies that the membrane has an elongation of less than 300%.

TABLE 1

Comparison of various technologies

| Technology/ Characteristics | Epoxy | SMP polymer | Polyurethane | Acrylic | Composition according to the invention |
|---|---|---|---|---|---|
| Color stability | no | yes | yes | yes | yes |
| Tear strength | no | no | yes | yes | yes |
| Adhesion to wet concrete | yes | yes | no | no | yes |
| Adhesion to concrete without primer | yes | yes | no | no | yes |
| Elongation greater than 300% | no | yes | yes | yes | yes |
| Number of layers in order to attain 1.5 mm of dry product | 1 layer | 1 layer | 3 layers | 3 layers | 1 layer |

The membrane according to the invention, obtained after crosslinking the liquid composition according to the invention, exhibits excellent performance for all of the characteristics evaluated. In particular, its color is stable, it has a good tear resistance and a single layer is sufficient to obtain a 1.5 mm thick membrane.

Example 2: Preparation of Liquid Compositions

The products below were used in the examples in the manufacture of the liquid compositions:
Silylated polymer (A1):
  MS Polymer® SAX350 available from the company KANEKA
Aminosilane as adhesion promoter and coupling agent (A3):
  SILQUEST® A1120 i.e. N-(beta-aminoethyl)-gamma-aminopropyltrimethoxysilane available from the company MOMENTIVE.
Amino catalysts (A2):
  ANCAMINE® K54 i.e. 2,4,6-tri(dimethylaminomethyl)phenol available from the company AIR PRODUCTS.
  BDMA i.e. dimethylbenzylamine available from the company AIR PRODUCTS.
  phenolic BDMA: (dimethylaminomethyl)phenol (CAS 25338-55-0).
Epoxyresin (B1):
  DER® 331, derivative of diglycidyl ether available from the company Dow.
Tin catalyst (for silylated polymer) (B2):
  TIEB KAT® 216 (dioctyltin dilaurate) available from the company TIB KAT.
other additive:
  SILQUEST® A171 i.e. vinyltrimethoxysilane $(CH_3O)_3SiCH=CH_2$ available from the company MOMENTIVE.

The examples of liquid compositions were prepared according to the following procedure:
Composition A: The following constituents are introduced into a mixer, with stirring and under nitrogen, preferably in the following order:
  i) Silylated polymer,
  ii) Amino catalyst,
  iii) Silquest® A1120,
  iv) Silquest® A171.
The compositions A are then packaged in an aluminum vacuum bag.
Composition B: The following constituents are introduced into a mixer, with stirring, preferably in the following order:
  i) Diglycidyl ether derivative,
  ii) Tin-based catalyst for silylated polymer,
  iii) (tap) water.
The composition B is packaged in a metal bucket.
The amounts of each of the constituents have been indicated in table 2 below.

TABLE 2 amounts of the ingredients of the liquid compositions tested

| Composition A | SAX® 350 | 62.305 grams |
|---|---|---|
| Composition A | Amino catalyst | See tables 3 and 4 below |
| Composition A | SILQUEST® A171 | 0.620 gram |
| Composition A | SILQUEST® A1120 | 1.245 grams |
| Composition B | DER® 331 | 31.150 grams |
| Composition B | TIB KAT® 216 | 1.245 grams |
| Composition B | H₂O (tap water) | 0.312 gram |

For the composition A, various catalytic systems (catalyst for the epoxy) were compared, specifically several amino catalysts were tested. Table 3 indicates the amino catalysts that were tested for the comparative compositions Comp1 to Comp7. Table 3 also gives the sum $\Phi(OH)+\Phi(CH_2-NR^7R^8)$ and the ratio $\Phi(OH)/\Phi(CH_2-NR^7R^8)$ such as were defined previously in the present application.

TABLE 3 amino catalysts for the epoxy (comparative catalytic systems)

| Amino catalyst for the epoxy (% by weight relative to the total weight of the liquid composition) | | $\Phi(OH)+\Phi(CH_2-NR^7R^8)$ (meq/g) | $\Phi(OH)/\Phi(CH_2-NR^7R^8)$ |
|---|---|---|---|
| Comp1 | 1.6% of ANCAMINE® K54 + 6.2% of BDMA | 69.97 | 0.09 |
| Comp2 | 1.6% of ANCAMINE® K54 + 9.2% of BDMA | 92.16 | 0.07 |
| Comp3 | 3.2% of ANCAMINE® K54 | 48.23 | 0.33 |
| Comp4 | 3.2% of ANCAMINE® K54 + 1.6% of phenol | 59.98 | 0.66 |
| Comp5 | 3.2% of ANCAMINE® K54 + 5% of BDMA + 0.8% of phenol | 91.08 | 0.25 |
| Comp6 | 11% of BDMA + 3.2% of phenol | 81.35 | 0.00 |
| Comp7 | 6.2% of phenolic BDMA | 82.01 | 1.00 |
| Comp8 | 6.2% of BDMA + 1.6% of phenol | 57.60 | 0.26 |

Table 4 indicates the amino catalysts that were tested for the compositions 1 to 3 according to the invention. Table 4 also gives the sum $\Phi(OH)+\Phi(CH_2-NR^7R^8)$ and the ratio $\Phi(OH)/\Phi(CH_2-NR^7R^8)$ such as were defined previously in the present application.

TABLE 4 amino catalysts for the epoxy (catalytic system according to the invention)

| | Amino catalyst for the epoxy (% by weight relative to the total weight of the liquid composition) | $\Phi(OH)+\Phi(CH_2-NR^7R^8)$ | $\Phi(OH)/\Phi(CH_2-NR^7R^8)$ |
|---|---|---|---|
| 1 | 1.6% of ANCAMINE® K54 + 4.8% of BDMA | 59.62 | 0.11 |
| 2 | 3.2% of ANCAMINE® K54 + 3.2% of BDMA | 71.90 | 0.20 |
| 3 | 3.2% of ANCAMINE® K54 + 5% of BDMA | 85.21 | 0.16 |

Example 3: Evaluation of the Performance of the Compositions

During the application of the liquid composition, the two compositions A and B are mixed in a one-to-one ratio by weight using a rotary mixer equipped with a mixing arm. For the examples, the liquid composition is applied by a roller on a Teflon-type non-stick surface so as to be able to remove the cured film the next day.

The tear strength measurements of the membrane obtained after crosslinking of the liquid composition were carried out according to the standard NF ISO 34-1 of 2010, method A (trouser test specimens).

Three different tear strength measurements were carried out:
Test 1: carried out 7 days after the manufacture of the membrane, the membrane having been stored at 23° C. and 50% relative humidity during these 7 days,
Test 2: carried out 14 days after the manufacture of the membrane, the membrane having been stored for 7 days at 23° C. in air, then 7 days at 80° C. in air,
Test 3: Test carried out 14 days after the manufacture of the membrane, the membrane having been stored for 7 days at 23° C. in air, then 7 days at 80° C. under water.

The results obtained are indicated in table 5 below.

TABLE 5

| Tear strength measurements (values expressed in N/mm) | | | |
|---|---|---|---|
| | Test 1 (N/mm) | Test 2 (N/mm) | Test 3 (N/mm) |
| Comp1 | 10 | 5.84 | 15.6 |
| Comp2 | 5 | — | — |
| Comp3 | 6.5 | 16 | 15 |
| Comp4 | 8.2 | — | — |
| Comp5 | 18 | 6 | 14.63 |
| Comp6 | 2 | — | — |
| Comp7 | 6.12 | — | — |
| Comp8 | 2.32 | — | — |
| 1 | 10.8 | 11.18 | 17.54 |
| 2 | 15.2 | 17.61 | 21.78 |
| 3 | 11.8 | 13.99 | 18.51 |

In order to obtain a membrane having satisfactory properties, it is preferable for the shear strength to be greater than or equal to 10 N/mm for each of the tests carried out, that illustrate the various conditions of use of the waterproofing membrane.

Thus, it is observed that the compositions 1 to 3 according to the invention make it possible to obtain a waterproofing membrane which has a shear strength that is greater than 10 N/mm for all the tests. In particular, the composition 2 according to the invention has an excellent tear strength for the three tests (greater than 15 N/mm).

On the contrary, the comparative examples Comp1, Comp4 and Comp7 are examples where the mixture of at least two catalysts does not satisfy the relationship (2) $\Phi(OH)/\Phi(CH_2-NR^7R^8)$. These examples do not make it possible to obtain good results for the three tests.

The comparative example Comp3 is an example where the liquid composition comprises a single catalyst for epoxy. This example does not make it possible to obtain good results for the three tests.

The comparative example Comp5 is an example where the mixture of at least two catalysts does not satisfy the relationship (1) $\Phi(OH)+\Phi(CH_2-NR^7R^8)$. This example does not make it possible to obtain good results for the three tests.

The comparative example Comp8 is an example where the liquid composition does not comprise at least one phenolic-type catalyst substituted by at least one —$(CH_2)$—$N(R^7R^8)$ function, knowing that the mixture of at least two catalysts of the example Comp8 satisfies the relationships (1) and (2). This example does not make it possible to obtain a good result in test 1.

Furthermore, the membrane according to the invention has a stable color, with no yellowing over time. Moreover, the liquid compositions comprising solely ANCAMINE® K54 as catalyst (A2) for epoxy result in membranes that do not satisfy the three tests described above.

The invention claimed is:
1. A liquid composition comprising a composition A and a composition B, said composition A comprising:
A1) from 20% to 80% by weight of at least one silylated polymer comprising at least one, group of formula (I):

$$-Si(R^4)_p(OR^5)_{3-p} \tag{I}$$

wherein:
$R^4$ and $R^5$, which are identical or different, each represent a linear or branched alkyl radical comprising from 1 to 4 carbon atoms, with the possibility that when there are several $R^4$ (or $R^5$) radicals, the latter are identical or different;
p is an integer equal to 0, 1 or 2;
A2) from 3% to 9% by weight of a mixture of at least two different aromatic-based catalysts (A2-1) and (A2-2), the catalyst (A2-1) being phenolic, substituted by at least one —$(CH_2)$—$N(R^7R^8)$ function, where $R^7$ and $R^8$ represent, independently of one another, a linear or branched alkyl radical comprising from 1 to 4 carbon atoms;
A3) from 0.1% to 2% by weight of at least one coupling agent for coupling between the silylated polymer present in the composition A and the epoxy resin present in the composition B;
and said composition B comprising:
B1) from 10% to 40% by weight of at least one epoxy resin;
B2) from 0.2% to 3% by weight of at least one silanol condensation catalyst;
the percentages by weight being expressed relative to the total weight of the liquid composition, the mixture of at least two catalysts (A2-1) and (A2-2) being chosen so that the following two relationships are respected:
(1) 48.00 meq/g≤$\Phi(OH)+\Phi(CH_2-NR^7R^8)$≤90.00 meq/g
(2) 0.10≤$\Phi(OH)/\Phi(CH_2-NR^7R^8)$≤0.33
in said relationships (1) and (2):
$\Phi(OH)$ represents the number of —OH functions borne by an aromatic ring expressed in milliequivalents per gram of liquid composition;
$\Phi(CH_2-NR^7R^8)$ represents the number of —$CH_2$—$NR^7R^8$ functions borne by an aromatic ring expressed in milliequivalents per gram of liquid composition.
2. The liquid composition as claimed in claim 1, wherein the silylated polymer corresponds to one of the formulae (II), (III) or (IV):

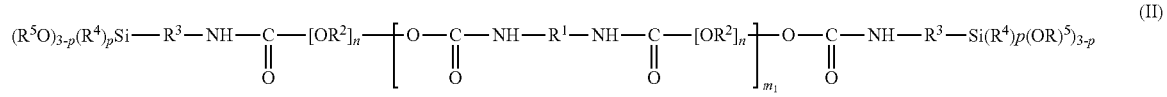

-continued

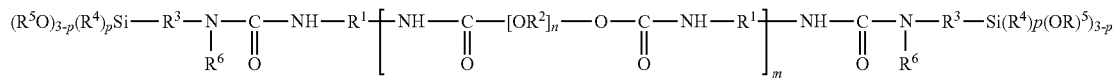

(IV)

wherein:
- $R^1$ represents a hydrocarbon-based divalent radical having 5 to 15 carbon atoms, which may be aromatic or aliphatic, linear, branched or cyclic,
- $R^3$ represents a linear or branched alkylene divalent radical having 1 to 6 carbon atoms,
- $R^2$ represents a linear or branched alkylene divalent radical having 2 to 4 carbon atoms,
- $R^4$ and $R^5$, which are identical or different, each represent a linear or branched alkyl radical having 1 to 4 carbon atoms,
- $R^6$ represents a hydrogen atom, a phenyl radical or a linear, branched or cyclic alkyl radical having 1 to 6 carbon atoms,
- n is an integer such that the average molar mass of the polyether block of formula —$[OR^2]_n$-ranges from 200 g/mol to 40,000 g/mol,
- $m_1$ is zero or an integer such that the average molar mass of the polymer ranges from 500 g/mol to 50,000 g/mol,
- m is an integer other than zero such that the average molar mass of the polymer ranges from 500 g/mol to 50,000 g/mol,
- p is an integer equal to 0, 1 or 2.

3. The liquid composition as claimed in claim 1, wherein the catalyst (A2-1) comprises at least one phenolic ring substituted by at least two —$(CH_2)$—$N(CH_3)_2$ functions.

4. The liquid composition according to claim 3, wherein the two —$(CH_2)$—$N(CH_3)_2$ functions are in the ortho position to the OH group.

5. The liquid composition as claimed in claim 1, wherein the catalyst (A2-1) is:

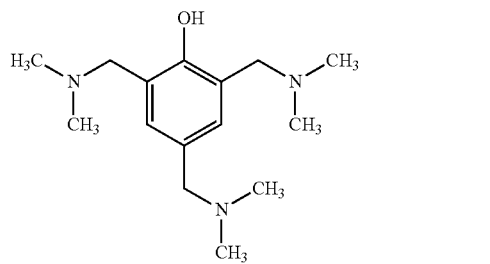

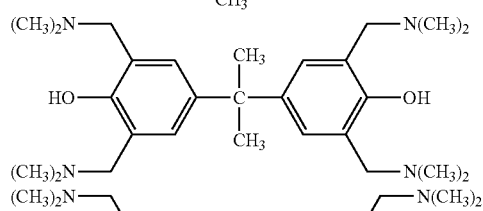

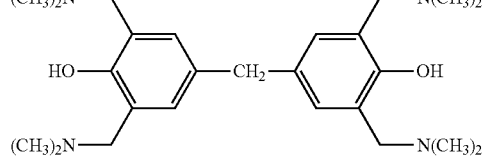

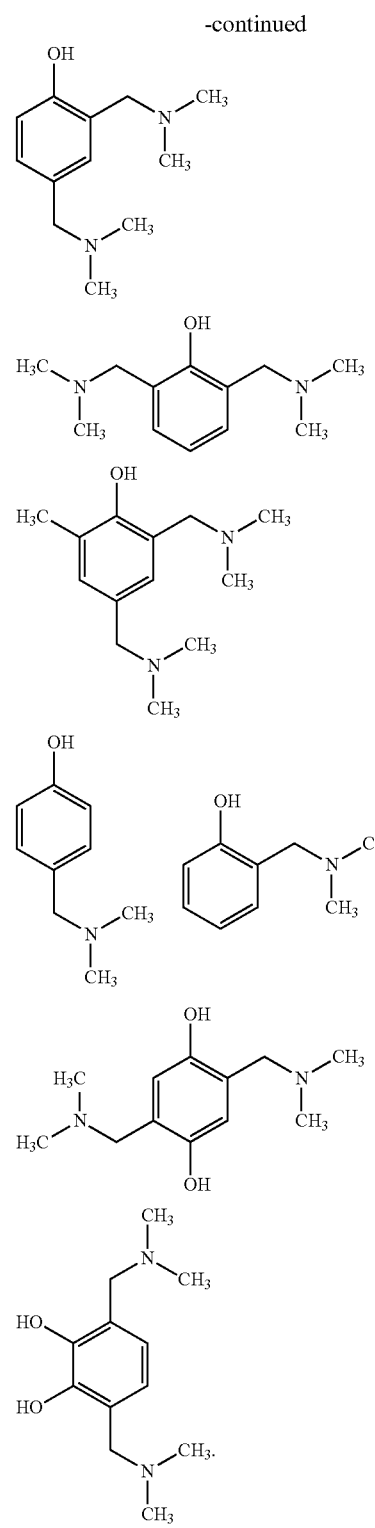

6. The liquid composition according to claim 5, wherein (A2-1) is tri(dimethylaminomethyl)phenol corresponding to the following formula:

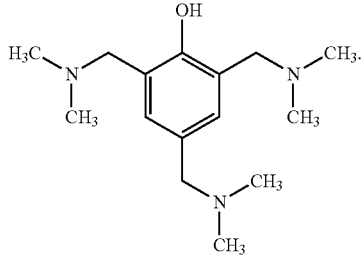 [SMILES: CN(C)Cc1cc(CN(C)C)c(O)c(CN(C)C)c1]

7. The liquid composition as claimed in claim 1, wherein the catalyst (A2-2) different from the catalyst (A2-1) is an aromatic compound comprising at least one hydroxyl function or at least one —(CH$_2$)—N(CH$_3$)$_2$ function.

8. The liquid composition as claimed in claim 1, wherein the catalyst (A2-2) is:

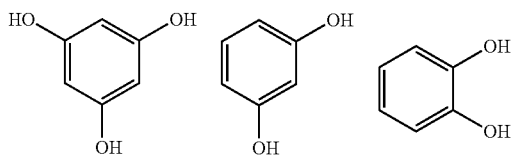

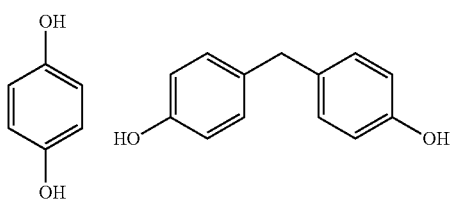

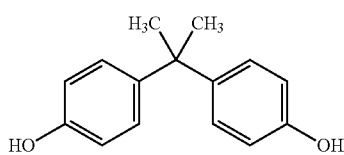

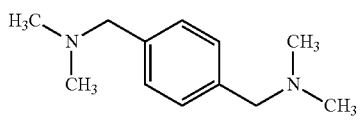

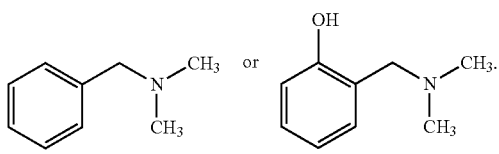

9. The liquid composition according to claim 8, wherein the catalyst (A2-2) is one of the following:

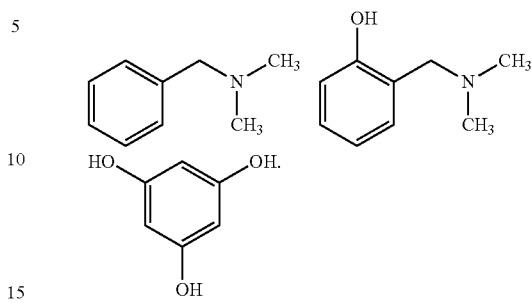

10. The liquid composition according to claim 8, wherein the catalyst (A2-2) is the dimethylbenzylamine compound of the formula

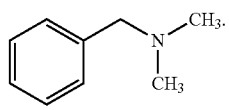

11. The liquid composition as claimed in claim 1, wherein (A2) comprises a mixture of 2,4,6-tri(dimethylaminomethyl)phenol as catalyst (A2-1) and of dimethylbenzylamine as catalyst (A2-2).

12. The liquid composition as claimed in claim 1, wherein the following two relationships are respected:
(1) 50.00 meq/g ≤ Φ(OH)+Φ(CH$_2$—NR$^7$R$^8$) ≤ 90.00 meq/g
(2) 0.10 ≤ Φ(OH)/Φ(CH$_2$—NR$^7$R$^8$) ≤ 0.30
in said relationships (1) and (2):
Φ(OH) represents the number of —OH functions borne by an aromatic ring expressed in milliequivalents per gram of liquid composition;
Φ((CH$_2$)—N(R$^7$R$^8$)$_2$) represents the number of —CH$_2$—NR$^7$R$^8$ functions borne by an aromatic ring expressed in milliequivalents per gram of liquid composition.

13. The liquid composition as claimed in claim 1, wherein the epoxy resin (B1) is derived from diglycidyl ether.

14. The liquid composition as claimed in claim 1, wherein the coupling agent (A3) is a bifunctional compound comprising at least one first function capable of reacting with the silylated polymer (A1) and one second function capable of reacting with the epoxy resin (B1).

15. A ready-to-use kit comprising the liquid composition as claimed in claim 1, the compositions A and B being packaged in two separate compartments.

16. A waterproofing membrane obtained by crosslinking the liquid composition as claimed in claim 1.

17. A surface coated with a membrane as claimed in claim 16.

18. A process for waterproofing a surface, said process comprising the application then the crosslinking of the liquid composition as claimed in claim 1 on said surface.

19. The liquid composition according to claim 1, wherein A2) contains at least two groups of formula I.

* * * * *